Feb. 18, 1969  J. J. NOBEL  3,428,383

WHEELED EMERGENCY CARE VEHICLE

Filed Oct. 21, 1966

INVENTOR.
JOEL J. NOBEL
BY
*Flehr and Swain*
ATTORNEYS

# United States Patent Office 3,428,383
Patented Feb. 18, 1969

3,428,383
WHEELED EMERGENCY CARE VEHICLE
Joel J. Nobel, Philadelphia, Pa., assignor to Graduate Pain Research Foundation, Philadelphia, Pa.
Continuation-in-part of application Ser. No. 558,296, June 17, 1966. This application Oct. 21, 1966, Ser. No. 588,447
U.S. Cl. 312—209                             16 Claims
Int. Cl. A61b 19/02

ABSTRACT OF THE DISCLOSURE

An emergency care cart containing apparatus and instruments for cardio-pulmonary resuscitation includes a number of drawers containing consumable supply items. The drawers are arranged whereby after they have been opened they cannot be reclosed except by using a key. The top of the cart forms a firm support litter adapted to receive a cardiac patient and further includes an extension for elongating the litter. The extension, in its stored position, keeps the drawers closed.

Cross-reference to related application

This invention is a continuation-in-part of the invention in United States patent application Ser. No. 558,296, filed June 17, 1966, now abandoned, for Wheeled Emergency Care Litter.

Background of the invention

This invention relates to a mobile self-contained cardio-pulmonary resuscitation vehicle for emergency care such as a vehicle or cart with storage drawers, locking and retaining means for such drawers, and forming a litter for supporting a patient under treatment.

Cardio-pulmonary resuscitation is often a chaotic, desperately applied effort. This is true even in hospitals with relatively well organized programs. There are many reasons for the confusion which accompanies hurried attempts to postpone death and recover a viable human being. These include inefficient organization and delegation of responsibility, lack of an effective and continuing training program, difficulty in rapid communication, and delay in transport of equipment and personnel to the area of the emergency. Large gaps of our basic knowledge of the drying state, as well as disagreement regarding appropriate drug therapy and inadequate criteria for selecting proper candidates for resuscitation add to the problem.

When an institution does have a reasonable organization and training program, another major defect becomes apparent. Resuscitation equipment systems available at the present time are inherently inefficient. The conventional cart containing drugs and equipment which is wheeled to the patient's bedside is highly inadequate in a rushed, technically demanding situation.

The cart as disclosed herein differs significantly from the usual emergency carts both in concept and detail. It provides a firm litter surface upon which the patient is placed for resuscitation and, if necessary, subsequent transport to an intensive care unit or operating room. All drugs and equipment are beneath the litter surface in a series of drawers and compartments.

Time-motion studies have demonstrated that less time is required to place a subject on a litter than to move him from bed to floor or to place a backboard under the thorax. One of these procedures is required to maintain efficient external cardiac massage. Once the patient is placed on a specialized vehicle as disclosed herein, many advantages accrue. Instead of surrounding the subject with cumbersome equipment, he is fitted into an equipment system, and a more integrated and effective man-machine relationship results. The time required to properly meet the basic physiologic demands of airway, ventilation and artificial circulation is reduced. The subsequent sequence of connecting monitoring leads, establishing an intravenous route, administration of drugs and defibrillation follows more rapidly and logically. Errors in physical manipulation of equipment become less likely, and frustration, with attendant loss in efficiency, is diminished.

In addition to providing a firm base for external cardiac massage, the litter surface provides a nonconductive, easily cleaned plastic laminate isolating the patient electrically, and thereby minimizing the possibility of interference with the monitoring cardioscope and electrocardiograph. Shock hazard and inadvertent ground paths during defibrillation are prevented.

Summary of the invention

Accordingly, in general, there is provided an emergency care vehicle or cart which includes a body construction formed to provide a compartment adapted to contain electronic instruments, a compartment adapted to contain oxygen tanks and resuscitation apparatus and the like, and also a plurality of drawers adapted to contain consumable supplies such as anesthetics and the like. The body construction further is formed to include a firmly supported litter surface above the foregoing compartments for receiving a person laid thereon. Preferably, the litter surface is of an electronically insulative material which serves to isolate the electrical instruments carried within the compartments from a patient on the litter surface to minimize electrical interference therebetween as well as to protect against shock. Further, the litter surface includes an extension in the form of a leaf which is movable between a stored position and a supporting position so as to substantially form a continuation of the litter surface which elongates it sufficiently to receive a person lying outstretched upon the vehicle.

Having in mind the foregoing general arrangement, it becomes an object of the invention to provide an improved emergency care vehicle.

It is an object of this invention to provide an improved wheeled emergency care vehicle having a litter surface thereon.

It is another object of this invention to provide a drawer in combination with a movable litter surface extension, wherein said litter surface extension is provided with means to maintain said drawer in a closed but unlocked condition.

Other aims and objects of this invention are made apparent in the following specification and claims.

The invention is best understood in connection with the accompanying drawings in which like reference numerals refer to like parts and in which.

Description of the preferred embodiment

Figure 1:
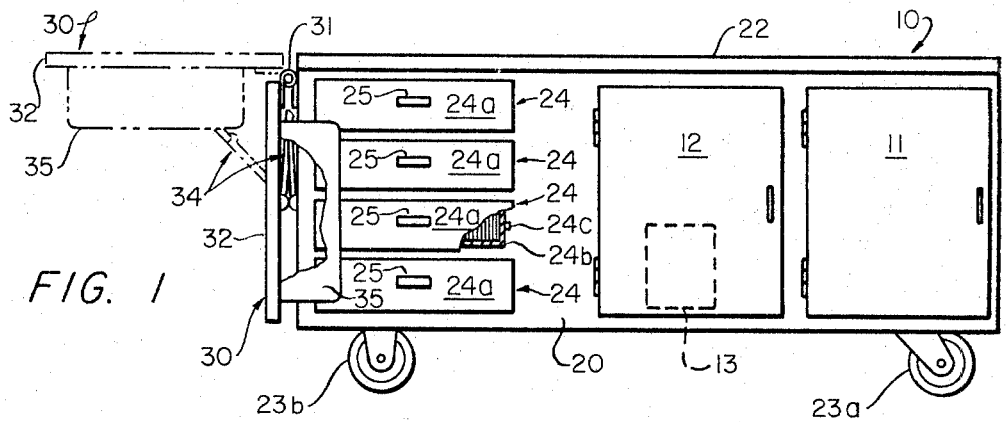
FIGURE 1 is a side elevational view of the litter, partly fragmented, partly in cross-section, and partly in phantom lines.

The wheeled emergency care litter vehicle is generally designated 10. It is best initially explained in connection with FIGURE 1. Vehicle 10 comprises a body generally designated 20. The body, and most of the other parts, such as the drawers and reinforcing structure are preferably made of tempered aircraft aluminum, but can be constructed of pressed or otherwise shaped steel or of fiber reinforced plastic. The overall dimensions of vehicle 10 are conveniently and preferably 56 inches long, 27 inches wide, and 33 inches high.

The top of body 20 includes a litter surface 22 fixed thereto. Litter surface 22 is conveniently and preferably edged or surrounded by a vinyl subrail.

Vehicle 10 is supported on a pair of swivel-mounted wheels 23a at one end and a pair of fixed mount wheels 23b elsewhere under the litter. Wheels 23a provide convenient turning of the vehicle while fixed wheels 23b prevent undesired lateral drifting when vehicle 10 is being pushed. The tires may preferably be made of polyurethane, which has a low compression set.

One end of vehicle 10 includes a movable litter surface extension generally designated 30. Its surface 32 is of the same structure as the fixed litter surface 22 described above. Extension 30 is affixed to the body 20 of vehicle 10 at hinge 31, permitting extension 30 to pivot from its lowered or storage position as shown in solid lines in FIGURE 1 to its raised or operating position as shown in phantom lines. In its raised position, extension 30 is supported by a brace 34.

Brace 34 is of the common hinged override lock type. That is, the diagonal brace is hinged to the underside of extension 30 and to the side of body 20. It is hinged together midway between its ends to permit bending in one direction but not in the other. However, the nature of the brace is not critical. An equally suitable brace may consist of two mutually telescoping sections, one fastened to extension 30 and the other to the side of body 20 with means such as a set screw to lock them together.

One side of extension 30 carries a downwardly depending retaining flange 35, movable to the raised position shown in phantom lines in FIGURE 1.

A plurality of drawers 24 are provided within body 20. It should be understood that drawers 24 herein disclosed occupy only one section or compartment of vehicle 10. Preferably three main compartments are formed within body 20. Compartment 11, under the patient's head is adapted to contain instruments for establishing and maintaining an airway, i.e., a respirator, oxygen tanks, suction and intubation gear. Compartment 12 is adapted to carry certain electronic apparatus, such as pacemaker, defibrillator, ECG direct writer, and monitoring oscilloscopes for display of ECG, EEG, and pulse pressure signals, as well as a self-contained power supply 13.

Each drawer 24 includes a drawer front 24a and a handle 25 on drawer front 24a.

The section containing the drawers is provided for systematic and logical storage of drugs, intravenous fluids, equipment and surgical trays. Drugs, for example, are stored in the top drawer in separate removable modules alphabetically sequenced by drug names. Each individual vial or ampule fits in an individual hole. All drawers are on full extension slides and are completely removable by pressing a release (not shown). This permits them to be used as trays, so that a nurse may prepare medications with occupying space close to the patient.

Inventory of drugs and equipment is facilitated by the modular storage of drugs and standardization of quantities, as well as fixed locations and labels for all permanent equipment. The conventional checklist is avoided together with its inherent errors. An item can be missing only if the labeled space containing it is empty.

In addition, for simplification of maintenance and control each door or drawer may be freely opened without a key, but cannot be closed without a key.

Preferably, as a typical example, the only available key is stored with the narcotics key at the nursing unit where the vehicle is kept. Tampering or use is immediately evident since the door or drawer cannot be shut. If open, the nurse assumes the contents are incomplete and inspects that single drawer. At each nursing shift, a brief glance at the vehicle demonstrates that all drawers are shut, and therefore, it may be safely assumed that they have not been opened since inspection and are complete. Upon return from an emergency, only those drawers which were actually opened need be inspected for replacement. The combined result is a reduction in maintenance time, provision of an adequate safeguard control and without causing delay during emergencies.

Preferably and conveniently, each drawer 24 contains a different class of stored items. For example, the top drawer may contain drugs such as epinephrine, digoxin and sodium bicarbonate. Typically, between ten and twenty different drugs are stored in the top drawer. The second drawer may contain equipment such as syringes, needles, and catheters. The third drawer may contain filled I.V. bottles and blood collection sets for phlebotomy. A fourth drawer may include gloves and surgical trays. It is understood that the above listing of items is not intended to be inclusive, but merely to give specimens or examples of the type of item that preferably is stored in each drawer.

Drawers 24 will always be unlocked. The purpose of having them unlocked is to insure immediate availability of the items when needed. When extension 30 is in its lowered or stored position, flange 35 overlaps part of all drawers 24, as best shown in FIGURE 1. This has the function of retaining the drawers from accidental opening and sliding, as might occur for example when the litter is being pushed.

Figure 3:
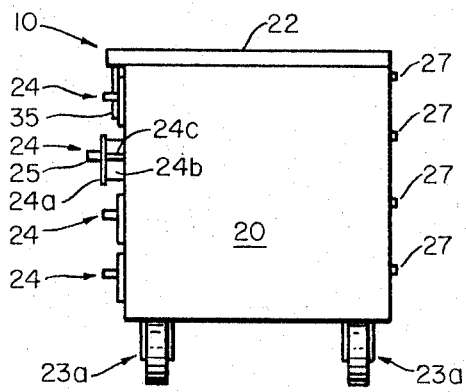
FIGURE 3 is an end view, also taken from the right side of FIGURE 1, showing the litter surface extension raised and a drawer open.
Figure 2:
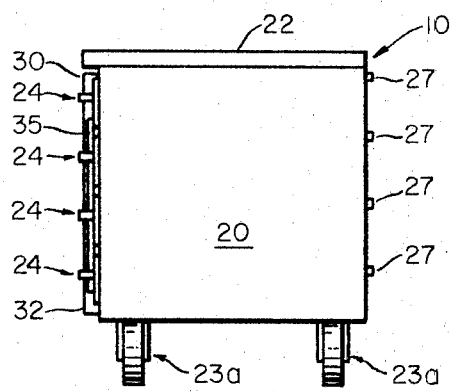
FIGURE 2 is an end view, taken from the right side of FIGURE 1, showing the drawers closed and the litter surface extension down.

When extension 30 is raised to the position shown in phantom lines in FIGURE 1 (as when a patient is to be placed thereon), flange 35 is swung clear of, and out of the path of, the drawer fronts 24a, thus permitting the drawers 24 to open freely. FIGURE 2 shows vehicle 10 with extension 30 in its downwardly depending stored position so that flange 35 retains the drawers. FIGURE 3 shows extension 30 raised to its patient-supporting position substantially forming a continuation of litter surface 22 of sufficient extent to receive a patient laid outstretched thereon. One of drawers 24 is partly extended.

Figure 4:
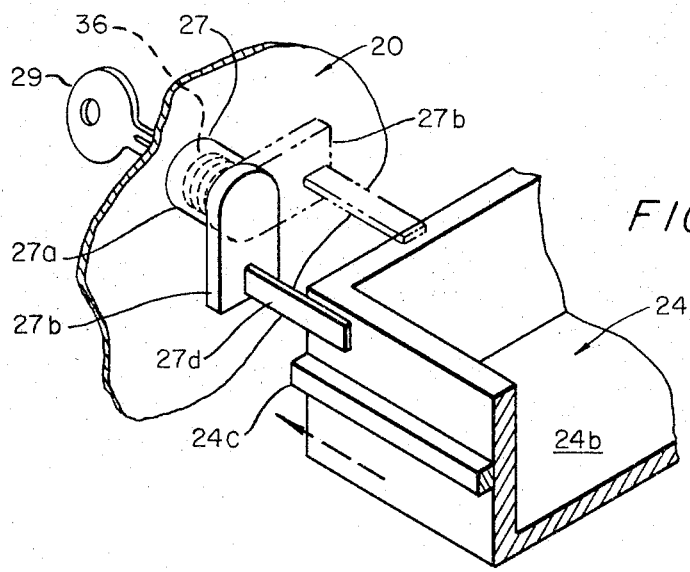
FIGURE 4 is an enlarged perspective detail view, partially fragmented, partially in cross-section, and partially in phantom lines of the detailed structure of the locking mechanism.

Once a drawer has been opened, it is desirable to have a positive indication of this event to warn that the drawer must be serviced. Means serving to signal a prior opening of a drawer comprises a mechanism which prevents the drawer from fully closing once it has been opened. Drawer 24 includes a bottom 24b and a slide guide 24c, of conventional construction. In the side wall of vehicle body 20 opposite to the side wall of body 20 adjacent to drawer front 24a, a lock 27 is provided for each drawer. The relationship of each lock 27 to the associated drawer 24 is best shown in FIGURES 2, 3 and 4. For purposes of description, the wall of body 20 adjacent drawer front 24a is called the front wall and the opposing side wall, that is, the one most remote from drawer front 24a, and on which locks 27 are mounted, is called the rear wall.

In FIGURE 4, lock 27 is shown mounted on and through the rear wall of body 20. The lock includes a lock body 27a on which is mounted a drawer stop 27b. In turn, drawer stop 27b has affixed to it a protruding retaining tab 27d disposed to engage an end portion of drawer 24. Stop 27b lies in the transverse position shown in dotted lines when drawer 24 is fully closed. When drawer 24 is withdrawn, stop 27b is rotated by a spring 36 to its upstanding position whereby stop 27b precludes complete drawer closure until rotated by key 29 to the horizontal position. As illustrated, drawer 24 has been pulled out, and to be returned to its closed position, it moves in the direction of the dotted arrow. It cannot be fully closed because the back of the drawer strikes drawer stop 27b. If the drawer is left open enough to provide clearance for tab 27d, it is apparent that by rotating key 29, drawer stop 27b can be returned to the horizontal position shown in dotted lines. In this position, the drawer can be fully closed since it slides under the drawer stop. The lock is provided with a spring bias tending to rotate the drawer stop 27b from the horizontal position to the vertical position. Thus, when drawer 24 is withdrawn by opening, drawer stop 27b will automatically rotate to the vertical position as soon as its tab 27d can clear the drawer. Thus, the automatic lock-open function is obtained.

It is understood that the exact structural details of lock 27 can vary while performing the same essential function. The flange 35 can be an open wire or similar loop. The structure on the lock-body 27a which acts to stop the drawer is generally called the stop means. The upstanding position of drawer stop 27b in solid lines in FIGURE 4 is called the first position or the vertical position, and the dotted lines show the transverse or second or horizontal position. A drawer 24 is said to be fully inserted within the body when its drawer front 24a abuts the front wall of cart body 20, that is, when the drawer has been pushed inwardly as far as it can go. When the stop means is in the first position, it is struck by the drawer, and this prevents a full closing of the drawer.

Compartments 11 and 12 are provided with hinged doors. Preferably, the door of compartment 11 (which contains consumable oxygen, etc.), may also be provided with lock-out devices of the same general type as described above in connection with drawer 24. The door of compartment 11 has its open edge near the junction of one of the end walls and one of the side walls of body 20. Where the compartment door is on a side wall, the lock is mounted on the adjacent end wall.

I claim:

1. In an emergency care vehicle including a body, wheels supporting said body, said body having front and rear walls, the top of said body forming a litter surface fixed thereto, a slidable drawer in said body extending between said front and rear walls, a drawer front on said drawer movable with said drawer to a position adjacent said front wall of said body, a lock on said rear wall of said body, said lock having stop means movable between two positions, a first of said positions preventing said drawer from being fully inserted into said body to space said drawer front from said front wall, said stop means being movable to a second position serving to permit said drawer to be fully inserted into said body, a litter surface extension carried adjacent said fixed litter surface and positionable from a stored position to form a continuation of the first named litter surface, and means on said litter surface extension for retaining said drawer within said body when said litter surface extension is in said stored position.

2. In a vehicle as set forth in claim 1 wherein said extension pivots from a depending stored position to a raised position forming a continuation of said litter surface, and a brace between said body and said litter surface extension, said brace being selectively settable to hold said litter surface extension in said raised position.

3. In a vehicle as set forth in claim 1 wherein said means to retain said drawer comprises a flange depending from and affixed to said litter surface extension, said flange overlapping at least part of said drawer front when said extension is in said stored position.

4. In a vehicle as set forth in claim 3 wherein said lock is rotatable and includes a lock body, said stop means includes a drawer stop carried by said lock body and movable between a transverse and an upstanding position, said drawer stop being spring urged and freely movable toward said upstanding position when said drawer is withdrawn and key-operated to said transverse position, said drawer stop being clear of said drawer when said drawer stop is in said transverse position to permit full closure of the drawer.

5. In a vehicle as set forth in claim 4 wherein said drawer stop in its transverse position is retained by said drawer against the urging of said spring, and is freely movable by said spring to said upstanding position when said drawer is withdrawn.

6. In a vehicle as set forth in claim 5 wherein there are a plurality of said drawers, arranged one above the other in said body, and each drawer includes a said stop means and a said drawer front, and said flange in its stored position overlaps at least part of each said drawer front.

7. In a vehicle as set forth in claim 6 wherein said fixed litter surface and said litter surface extension are of electrically insulative material.

8. An emergency care vehicle comprising means forming a body construction formed to include a compartment adapted to contain electronic instruments, a self-contained power supply in said compartment for operating said instruments, said body construction being further formed to include another compartment adapted to contain oxygen tanks and resuscitation apparatus, and a plurality of drawers adapted to contain consumable supplies, said body construction further being formed to include a firmly supported litter surface above said compartments for receiving a person laid thereon, the bounding edges of said litter surface being laterally unobstructed to permit a patient to be slidably moved laterally onto same, and wheels supporting said body construction for mobility, an electrically insulative material forming said litter surface and serving to isolate said power supply and instruments from a patient on said litter surface.

9. An emergency care vehicle according to claim 8 further including means forming an extension of said litter surface, said extension means being movable between a stored position and a supporting position serving to substantially form a continuation of said litter surface to elongate said litter surface sufficiently to receive an adult person lying outstretched thereon, and in its stored position serving to retain said drawers within said body construction.

10. In an emergency care vehicle comprising a body, said body having a front wall and a rear wall, a slidable drawer in said body extending between said front wall and said rear wall, a drawer front on said drawer, said drawer front being adjacent to said front wall of said body, a lock on said rear wall of said body adjacent to said drawer, said lock having stop means having two positions, said stop means having a first position preventing said drawer from being fully inserted into said body and keeping said drawer front spaced from said front wall, said stop means being adjustable to a second position to permit said drawer to be inserted into said body until said drawer front abuts said body front, a fixed litter surface provided on top of said body and a litter surface extension means provided pivotally affixed to and adjacent said fixed litter surface and between said front wall and said rear wall of said body, said litter surface extension means having a stored position and a raised position, means on said litter surface extension means to retain said drawer within said body when said litter surface extension means is in said stored position.

11. In an emergency care vehicle as set forth in claim 10 wherein a brace is provided between said body and said litter surface extension means, said brace being selectively settable to hold said litter surface extension means in said raised position.

12. In an emergency care vehicle as set forth in claim 10 wherein said means to retain said drawer comprises a flange depending from and affixed to said litter surface extension means, said flange overlapping at least part of said drawer front when said litter extension means is in said stored position.

13. In an emergency vehicle as set forth in claim 10 wherein said lock is rotatable and includes a lock body, said stop means including a drawer stop pivotally attached to said lock body between a horizontal and vertical position, said drawer stop being spring biased toward said vertical position and key-operated to said horizontal position, said drawer stop being spaced above said drawer when said drawer stop is in said horizontal position.

14. In an emergency care vehicle as set forth in claim 13 wherein said drawer stop is retained in its horizontal position against said spring bias by said drawer in an inserted condition and is movable by said spring to said vertical position when said drawer is withdrawn, said drawer stop preventing said drawer from being fully reinserted when said drawer stop is in said vertical position.

15. In an emergency care vehicle as set forth in claim 14 wherein there are a plurality of said drawers, arranged one above the other in said body, and each said drawer is provided with a said stop means and a said drawer front, and said flange overlaps at least part of each said drawer front in said stored position.

16. In an emergency care vehicle as set forth in claim 15 wherein said fixed litter surface and said litter surface extension means are of nonelectrically conductive plastic and said body of aluminum.

References Cited

UNITED STATES PATENTS

| | | | |
|---|---|---|---|
| 658,999 | 10/1900 | Scannell | 312—282 X |
| 1,000,268 | 8/1911 | Jadronja | 312—333 |
| 1,327,242 | 1/1920 | La Rue | 312—50 |
| 1,774,236 | 8/1930 | Ohnstrand | 312—333 X |
| 1,964,805 | 7/1934 | Barnes | 296—22 X |
| 2,133,347 | 8/1938 | Fedeler | 312—282 |
| 2,441,678 | 5/1948 | Tietje | 312—333 X |
| 3,116,849 | 1/1964 | Brewer et al. | 248—311 X |
| 3,304,116 | 2/1967 | Stryker | 296—20 |

BOBBY R. GAY, *Primary Examiner.*

J. L. KOHNEN, *Assistant Examiner.*

U.S. Cl. X.R.

312—250; 128—172